Jan. 27, 1942. D. PLATT ET AL 2,271,231
PLURAL AUTOMOBILE WINDOW WIPER AND COMMON MASTER CONTROL VALVE THEREFOR
Filed Dec. 3, 1940
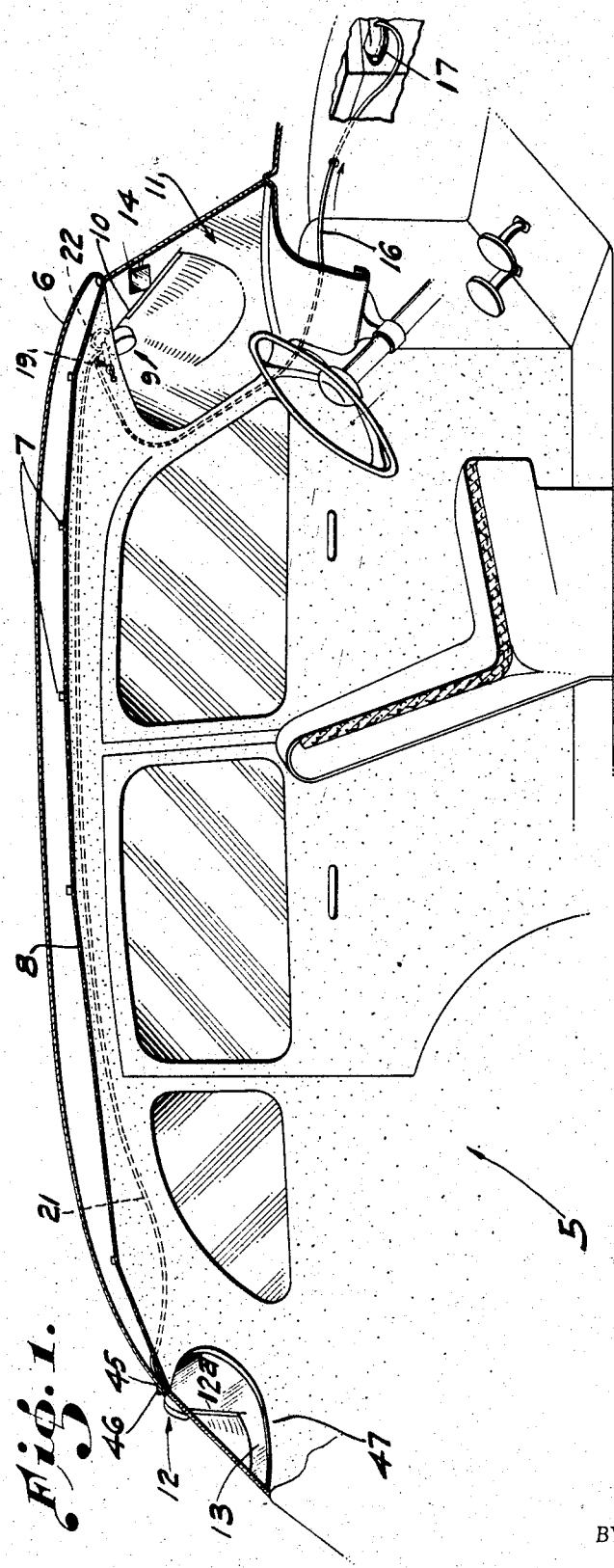
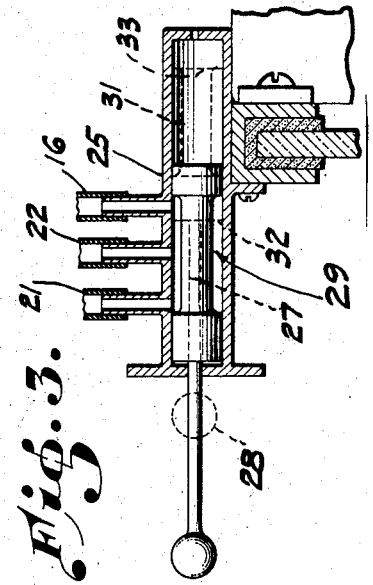
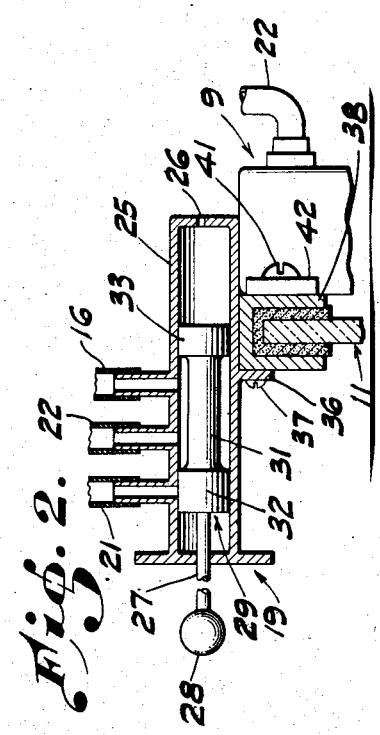
DAVID PLATT
JOHN W. BOOTHE
INVENTORS.
BY *ATTORNEY*

Patented Jan. 27, 1942

2,271,231

UNITED STATES PATENT OFFICE 2,271,231

PLURAL AUTOMOBILE WINDOW WIPER AND COMMON MASTER CONTROL VALVE THEREFOR

David Platt, South Pasadena, and John W. Boothe, Los Angeles, Calif.

Application December 3, 1940, Serial No. 368,352

7 Claims. (Cl. 15—255)

This invention relates to a combination front and rear window wiper construction for automobiles, said wipers being of the type operable by suction from the intake manifold of an internal combustion engine; and a unitary manually operable valve control means for directing the suction force to one or more of the window wiping devices.

The drivers of self-propelled vehicles find it necessary to keep an eye upon traffic at the rear of the vehicle as well as upon that in advance thereof, and in watching objects rearward of the vehicle find it most convenient to do so by looking through the rear window of the car by means of the reflection thereof seen upon the rear vision mirror located in an overhead position at the front of the car. In the following out of this procedure his vision is as much hindered by fog, rain, or moisture collecting upon the rear window of the car, as it is by similar obstructing elements upon the windshield. An important object of the present invention is to overcome the obscuring of the rear window of the car, by a simplified improved mechanical means which may be operated simultaneously with the means for operating the front windshield wiper, and which will be provided with a manual control conveniently located in relation to the driver's seat.

The invention includes the combination, with the rear window, and the rear vision mirror for viewing traffic therethrough, of a mechanically operable wiper for said rear window, the operation of which is manually controllable by the driver from a point adjacent to his seat.

Other objects of the invention are; to provide an improved arrangement of conduits for conducting the suction force from the intake manifold of the engine to a plurality of window wiping devices for the purpose of operating at least one of said devices, whenever desired, and also for operating two or more of them simultaneously as occasion may require; to provide an improved slide valve construction for controlling the suction force through the conduits aforesaid by means of a unitary valve structure; and to provide a more stable and satisfactory general assembly of parts for carrying out the aforesaid objects and advantages.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawing, which illustrates what is at present deemed to be a preferred embodiment of the invention, Fig. 1 is a vertical, longitudinal mid-section of a portion of an automobile body showing the invention applied thereto.

Fig. 2 is a vertical mid-section of the valve control means showing the valve proper in one of its operative positions. In this view a fragment only of the supporting means is shown and some other parts of the view are broken away to contract the size thereof.

Fig. 3 is a view similar to Fig. 2 but differs therefrom in that the valve is shown adjusted to a different operative position and still another position of the valve is indicated by dotted lines.

Referring in detail to the drawing, therein is shown a portion 5 of an automobile body having a conventional turtle back roof 6 furnished with the usual arcuate crosspieces 7 which support the inner covering 8; a front conventional suction operable window wiping device 9, arranged to operate the wiper arm 10 upon the windshield 11; a like wiping device 12 arranged to operate the wiper arm 12a upon the rear window 13 visible to the driver as he looks upon the rear vision mirror 14; a suction conduit 16 leading from the engine intake manifold 17; a manually operable valve control means 19 to which said conduit 16 leads; and an overhead conduit 21 leading from said valve device to the already mentioned rear window wiper 12.

It is found advantageous to disposed the suction conduit 21 adjacent to one side of the roof of the car, not only because the upwardly arched crosspieces 7 of the roof tend to cause said conduit when supported by them to gravitate to one side of the automobile, but also for the reason that the wiper for the rear window need be positioned to wipe only the part of the rear window (whether double or single) which is located on the driver's side of the car, and hence a lateral position of the conduit affords the most direct connection therefor.

In addition to the conduits which have already been described, there is provided a conduit 22 which leads from said valve control means 19 to the front window device 9 to supply suction to said device for its operation. The various conduits 16, 21, and 22, as seen from Figs. 2 and 3, communicate with a valve cylinder 25 at spaced apart points in relation to the length of said cylinder. Said cylinder 25 is provided at one end with a relief vent 26 and at its opposite end has a central hole of the proper shape and size to receive with a working fit the stem 27 of an operating handle 28, said handle serving as a means for manually adjusting the position of the piston valve member 29 which is slidably fitted within the cylinder 25. Said member 29 is of a generally cylindrical shape, but has a diametrically reduced intermediate portion 31, at one end of which is a head 32 and at the other end of which is a head 33, said heads having a substantially fluid-tight fit within the cylinder, but there being an annular space between said cylinder and the diametrically reduced part 31. The part 31 of the valve is of a sufficient length to extend across either one or all of the three passages whereby the conduits 16, 21, and 22 communicate with the cylinder.

When the piston valve is in the position shown in Fig. 2 the passage to the tube that controls the rear wiping device 12 is closed, but the other two tubes are left in communication with the valve cylinder. Hence at this time suction from the intake manifold 17 is communicated through the tube 16 to the tube 22 to operate the front wiping device 9. Said device 9 operates in a well known manner, being provided with a spring (not shown) which automatically pulls the wiper arm 10 in one direction after said arm has been pulled in the opposite direction by each suction impulse from the engine manifold.

The valve device 19 is attached in any suitable manner to some part of the vehicle which will support it properly. In Figs. 2 and 3 it is shown secured by means of its flange 36 and a screw 37 to the upper frame section 38 of the windshield 11.

The windshield wiping device 9 is shown attached to said upper section 38 by means of a screw 41 extending through the flange 42 of said wiping device.

The rear wiping device 12 may be mounted in its operative relation to the rear window 13 in a variety of ways but is shown furnished with a flange or extension 45 whereby it is secured by means of a screw 46 to the casing 47 of said rear window, similarly to the windshield mounting device which was previously described.

In the operation of the device, whenever the driver notices that the rear window 13, observable by means of the rear vision mirror 14, is becoming obscured, by moisture or otherwise, to remove the obscurity it will only be necessary for him to adjust the slidable piston valve 29 to the position shown in Fig. 3, which he will accomplish by pulling out the handle 28 to the fully extended position. This will admit suction from the manifold 17 through the tube 16 and such suction will be communicated by the tubes 21 and 22 both to the rear wiper device 12 and the windshield wiper device 9 causing both these wipers to operate so that the driver will be afforded a clear vision both in advance of the vehicle and to the rear thereof. The driver will optionally adjust the slide valve to the position shown in Fig. 2 wherein suction from the manifold will be communicated only to the windshield wiper, when operating on the open highways or in districts where rear traffic observation is unnecessary. The valve piston structure 29 fits sufficiently tight within the tubular valve casing 25 to maintain itself in the aforementioned adjusted positions. In addition to the advantages already stated, guarding against obstructed vision through the rear window aids the driver in viewing objects rearward of the car when he desires to back the car for parking or for any other reason; and also an unobscured rear window aids autoists driving in the rear of his car to look through both glass window areas being mechanically wiped to observe the condition of traffic in advance thereof and thus judge more accurately whether or not there is sufficient time to pass his car without clashing with the traffic in advance thereof.

What is claimed is:

1. A wiper mounted in an operative relation to a windshield of a conventional automotive structure, a wiper mounted in an operative relation to a rear window thereof, conduits arranged to supply an operative suction force from the engine manifold of said structure to both of said wipers, and a single manually operable valvular means to control the suction through said conduits to cause the windshield wiper alone to operate or to cause both of said wipers to operate simultaneously, said valvular means including a valve cylinder having a cylindrical piston valve slidable therein with a working fit, said piston valve having a central portion of reduced diameter and being manually adjustable to place one or both of said conduits into communication with the space within said cylinder opposite said diametrically reduced portion.

2. In an automobile having a plurality of windows, a windshield wiper mounted in a juxtaposed relation to each of said windows whereby the wiper arm of each wiper operates to remove matter from said windows obscuring the driver's vision, conduits arranged to supply an operating suction force from the engine manifold of the automobile to all of said wipers, and a single manually operable valvular means to control the suction through said conduits to cause more than one of said wipers to operate simultaneously or to cause a single one of them to operate, said valvular means including a valve cylinder and a valve therein, said valve being manually adjustable to place both or one of said conduits which connects with said wipers into communication with the conduit which connects said valvular means to said manifold.

3. In an automobile having a plurality of windows, a plurality of wiping devices each of which is mounted adjacent to one of said windows, a common control mechanism including a chamber, said chamber being connected by means of conduits individually to the several said wiping devices, and means movably mounted in said chamber and operatively related to each conduit to selectively place one or a plurality of said devices into operation by means of suction applied through said conduits and said control mechanism.

4. In a plurality of window cleaners, a plurality of wiper blades, individual actuating devices one associated with each of said blades respectively for operating the same, a common control valve including a chamber, conduits individually connecting said chamber with the several actuating devices, and a piston construction reciprocable in said chamber to selectively place one or more than one of said conduits in common suction communication.

5. In an automobile having a plurality of windows, a plurality of wiper blades each having an individual actuating device, each of said actuating devices together with its wiper blade being mounted in an operative relation to one of said windows, a manually operable valve-controlled means common to all of said actuating devices, and a plurality of conduits communicating with a chamber provided by said control, one of said conduits placing the actuating device of the wiper blade of one window in communication with said chamber, another conduit placing the actuating device of another wiper blade of another window in communication with said chamber, and still another conduit placing said chamber in communication with a suction means whereby upon adjusting the valve to different positions in said chamber one or more than one of said blades is caused to operate.

6. A wiper mounted in an operative relation to a windshield of an automotive structure, a wiper mounted in an operative relation to a rear window thereof, conduits arranged to supply an operative suction force to both of said wipers, and a manually operable valve to control the suction through said conduits to cause the windshield wiper alone to operate or to cause both of said wipers to operate simultaneously, said valve including a cylinder having a valve slidable therein with a working fit, said valve having a connected front and rear head which are spaced apart and being manually adjustable to place one or both of said conduits into communication with the space within said cylinder between said heads.

7. A wiper mounted in an operative relation to a rear window of a conventional automotive structure, conduits arranged to supply an operative force from the engine manifold of said structure to said wiper, and manually operable valvular means accessible from the driver's seat to control the suction through said conduits to cause said wiper to operate, said valvular means including a valve cylinder having a cylindrical piston valve slidable therein with a working fit, said cylinder being provided at one end with a hole, an operating handle provided with a stem extending through said hole and connected to the valve, said piston valve having a central portion of reduced diameter and being manually adjustable by said handle to place said conduits into communication with the space within said cylinder opposite said diametrically reduced portion.

DAVID PLATT.
JOHN W. BOOTHE.